United States Patent [19]

Voss et al.

[11] 4,323,530

[45] Apr. 6, 1982

[54] METHOD OF LUBRICATING COMPRESSION TOOLS OF MOLDING MACHINES

[75] Inventors: Günther Voss, Brietbrunn; Peter Gruber, Biberach an der Riss, both of Fed. Rep. of Germany

[73] Assignee: Boehringer Ingelheim GmbH, Ingelheim am Rhein, Fed. Rep. of Germany

[21] Appl. No.: 119,479

[22] Filed: Feb. 7, 1980

Related U.S. Application Data

[63] Continuation of Ser. No. 897,571, Apr. 19, 1978, abandoned.

[30] Foreign Application Priority Data

Apr. 20, 1977 [DE] Fed. Rep. of Germany ....... 2717438
Mar. 23, 1978 [DE] Fed. Rep. of Germany ....... 2812677

[51] Int. Cl.[3] .............................................. B29D 7/02

[52] U.S. Cl. .................................... 264/109; 264/213; 264/338; 427/3; 427/133; 427/421

[58] Field of Search .................... 427/3, 133, 135, 421; 264/109, 213, 338

[56] References Cited

U.S. PATENT DOCUMENTS

| | | | |
|---|---|---|---|
| 2,287,270 | 6/1942 | Partridge | 427/133X |
| 4,072,551 | 2/1978 | Dabal | 427/3 X |
| 4,139,589 | 2/1979 | Beringer et al. | 427/3 X |

*Primary Examiner*—Bernard D. Pianalto
*Attorney, Agent, or Firm*—Hammond & Littell, Weissenberger and Muserlian

[57] ABSTRACT

A method for spraying compression tools, for example, consisting of upper and lower die and matrix, of machines for the manufacture of molded articles, which comprises applying dissolved, molten or suspended lubricants to the tool surfaces, generally before each compression operation, by means of an intermittently and briefly spraying nozzle system.

14 Claims, No Drawings

METHOD OF LUBRICATING COMPRESSION TOOLS OF MOLDING MACHINES

This is a continuation of copending application Ser. No. 897,571, filed Apr. 19, 1978, now abandoned.

This invention relates to a method for spraying compression tools, for example, consisting of upper and lower die and matrix, of machines for the manufacture of molded articles, which is characterized in that dissolved, molten or suspended lubricants are applied to the tool surfaces, generally before each compression operation, by means of an intermittently and briefly spraying nozzle system.

BACKGROUND OF THE INVENTION

It is conventional, for example, in tableting to add the mixture to be tableted ("aggregate"), in addition to other auxiliary and carrier substances, also so-called lubricants (also known as sliding or separating agents), as well as, if necessary, to spray the mixture therewith. These are generally intended to reduce the friction of the dies moving up and down in the matrix bore and also the sliding friction between the tablet gate and matrix wall; furthermore, they have to generate a separating or anti-adhesion action so that the pressed articles are detached perfectly from the molding tools.

Intermixing or spraying of the lubricants presents a series of well known disadvantages. Lipophilization (water-repelling action) occurring on the surfaces of the individual articles generally causes in tablet manufacture, apart from poorer pressing capacity, also an increase in the decomposition of the molded articles. The resultant low breaking strengths of the molded articles have to be improved again by the increased use of expensive binding agents. In the case of pressed articles of active substance, lipophilization of the surfaces and the increased use of binding agents may result in a reduction in bio-availability. Since the negative effects of the lubricants are extraordinarily dependent on the manufacturing conditions (size of mixture, type of granulating apparatus, type of mixer, etc.), when these substances are used, it is also necessary to allow for the negative effects on the bio-equivalence of individual production batches. Finally, in the case of a number of active substances intermixing of the lubricants (e.g. magnesium stearate) has a negative influence on active substance stability, added to which is the fact that in certain applications the lubricants are responsible for the poor flavor of the pressed articles.

Attempts have therefore already been made to abandon completely the admixture of lubricants and, instead, to coat with lubricants the mold or press compartment which is formed by the matrix bore and the active parts of the upper and lower die and in which the tablet or molded articles is pressed. Here, especially for the manufacture of so-called effervescent tablets in which it is important to ensure rapid decomposability and clear dissolving, a method has been developed in which after each pressing operation the pressing tool is coated by the extrusion of a so-called "lubricating granulate" (empty granulate) (see German Offenlegungsschrift No. 2,440,383). This method has, however, the disadvantage of a higher consumption of time owing to the necessity of preparing the lubricating granulate and to a considerable reduction in the capacity of the tableting machine. Also, this method is suitable exclusively for double-sided tablet presses.

DESCRIPTION OF THE INVENTION

It has now been found that uniform spraying of the pressing tools can be achieved without the said disadvantages, if the dissolved, molten or suspended lubricant is applied to the surfaces of the pressing tools before the pressing operation by means of an intermittently and briefly spraying, aimed nozzle system. In this way, only the pressing tool surfaces participating in the pressing operation, but not the parts thereof not participating in the pressing operation, are wetted. With an undirected application of the lubricant, for example, by simply misting or sublimating it on, the machine and the granulate to be extruded are severely contaminated.

The method is applicable to all machines which compress masses of different composition into molded articles, for example, in the pharmaceutical industry for the manufacture of capsules or tablets, and in the food industry for the manufacture of compressed articles or the manufacture of molded articles from ceramic masses, or of catalyst masses. The method is highly suitable for so-called high speed machines with an output of 250,000 pressed articles per hour (at one press point, single tool).

The lubricant is applied by a directed spray jet. The directed spray jet preferably comes from liquid pressure nozzles (one-substance nozzle), where the lubricant under pressure is atomized without further auxiliary agents, or from two-substance nozzles which atomize the lubricant with the aid of compressed air, steam or gas as propellant. Atomization can be achieved also with the aid of a small ultrasonic vibrator to which the liquid lubricant is supplied.

Intermittent spraying can be obtained, for example by valves connected to the nozzles and working mechanically, electromagnetically, pneumatically or hydraulically, whereby these valves regulate either the metered or unmetered feed of the lubricant or the metered or unmetered supply of the vehicle (e.g. air) ensuring spraying.

Intermittent spraying can also be achieved by dividing a continuous spray jet into individual spray pulses by means of a perforated disc driven by a synchronous motor. Finally, spray pulses are obtained at very short time intervals by supplying a lubricant continuously to an intermittently operating ultrasonic vibrator.

Preferred forms made use, for example, of:

(a) a mechanically or electromagnetically operated valve which meters and interrupts the airflow, the lubricant being permanently available, for example, in an atomizer tube or in a two-substance nozzle through which the air jet flows: or (b) a hydraulically, electromagnetically or mechanically intermittently working valve (e.g. Diesel injection valve with nozzle) in conjunction with special nozzles (one-substance nozzle principle), for example, with hollow-cone nozzles (or eccentric-spray nozzles), or (c) continuous spraying of the lubricant on the principle of the one-substance or two-substance nozzle, whereby the intermittent function is achieved by using a synchronously working perforated disc. "Synchronously" means that the spray jet is released by the perforated disc when the pressing tool to be sprayed is positioned at the point provided for it, or (d) an intermittently working ultrasonic vibrator to which metered quantities of lubricant are supplied; precise alignment for application of the atomized lubricant can be assisted by the use of a directed air jet or by means of baffle plates, or (e) an electromagnetically operated valve whose metered air pulses actuate a further valve (servo-valve) which meters out the lubricant and releases it intermittently for spraying (to be recommended on "hot-melt" equipment).

As a rule, air (e.g. undried, dried, cooled, heated, moistened), water vapor or inert gases are used in spraying with the two-substance nozzle. The lubricant can be conveyed to the nozzle via plurality of pumps (for example, piston, geared or compressed-air pumps) or via a pressure vessel.

To ensure that, for example, tablet presses cannot work without lubrication, flow monitors are inserted, as a rule, in the lubricant and air flow, which transmit a pulse, when necessary, to switch off the machine.

Multiple tools can be used on tablet presses, for example, by the attachment of several nozzles.

Due to the relatively high impact velocity, parts of the lubricant can be lost or be deposited at undesirable points. However, this can be prevented, if desired, by the attachment of one or more suction heads. It is possible to check the quantity of lubricant applied per shot, e.g. by placing a piece of absorbent paper on the cup formed by the matrix bore and active part of the lower die, spraying it consecutively with 100 to 1000 shots of lubricant, weighing it and dividing by 100 or 1000.

The lubricant is used in dissolved or molten or suspended form. Therefore, substances to be converted especially easily into this form are, for example, fatty acids and their salts; the so-called metal soaps, such as magnesium stearate; also, fatty acid esters, especially those with polyols such as glycerin, as well as higher aliphatic alcohols, polyethylene glycols; or also separating agents such as paraffin or silicone oil. Lower aliphatic alcohols, such as ethanol or isopropanol, are appropriately used as solvents.

In many cases the use of a molten lubricant is recommended for so-called "hot melt" equipment connected to the nozzle system; "hot melt" equipment consisting of an above-described spray system, but in conjunction with a heating device which contains the melt in the supply container and in the delivery pipe in the molten state. Used above all are low-melting, so-called "plastic" lubricants such as glycerin and monostearate (GMS) or mixtures of this substance with glycerin distearate or tristearate.

The spray system used to apply the lubricant can, in principle, be installed anywhere in front of the point of the actual pressing or compression operation. The directed spray jet can, in principle, be emitted in all directions. For example, it is possible to spray from above into the "cup" formed by the matrix bore and the active face of the lower die and from below onto the active fact of the (raised) upper die of a tablet press or, on a capsule machine, exclusively into the filling tube.

To obtain the control signal for releasing the intermittent and directed spray jet (for it to be available when the tool to be sprayed is positioned at the point provided for it), the most diverse methods can be adopted; for example, the necessary control signals can be received from moving parts of the machine mechanically or via photocells or via inductive or capacitive proximity switches or on the principle of hydraulics, for example, on a tablet press by a tap on the upper or lower die.

The method according to the invention has the special advantage that, due to the directed, concentrated application of lubricant on the stressed parts of the molding tool, it becomes possible to reduce the consumption of lubricant to 1/10 to 1/100 of the conventional quantity (approximately 0.5 to 5% of the total mixture). It is known that especially in the case of angular pressed articles (e.g. square) or in the pressing of catalyst or ceramic masses increased wear of pressing tools has to be taken into account. Here, also, tool wear is reduced by the directed application of lubricant on the especially stressed parts of the molding tool, together with a specially designed curved path for the lower die. Further, directed spraying offers advantages in the case of tools with complicated engraving where it has hitherto been possible to prevent adhesion on the pressing tools only by increasing the proportion of lubricant in the mixture. Operating disturbances, e.g. adhesion on the pressing tools due to high air humidity, varying grain size distribution of the mixture, etc, which have previously meant a change in the porportion of lubricant in the total mixture, can now be rectified immediately e.g. by increasing the spraying time of a valve.

The method according to the invention has, however, the very special advantage that the lubricant no longer has to be intermixed with the material to be compressed. The prerequisite is thereby created of manufacturing pressed articles with higher breaking strengths and lower abrasion, economizing on expensive and easily pressed auxiliary substances and, consequently, minimizing the tablet size. Especially in the pharmaceutical industry, the absence of mostly hydrophobic lubricants from the total surface of the mixture brings about a reduction in the decomposition times of pressed articles, a more rapid moistening of the compressed powder bed of capsules and a generally faster wetting of the active substance in both forms. These factors create prerequisites for increasing bio-availability in the case of critical active substances and for improving the bio-equivalence of individual production batches. By omitting the admixture of lubricant in the powder bed to be compressed numerous known incompatibilities between active substance and lubricant (especially with magnesium stearate) are avoided and flavor problems caused by lubricants in compressed food articles are forestalled.

The following examples illustrate the present invention and will enable others skilled in the art to understand it more completely. It should be understood, however, that the invention is not limited solely to the particular examples given below.

EXAMPLE 1

3.5 kg of ephedrin. HCl, 16.4 kg of lactose, 19.4 kg of corn starch, 1.4 kg of colloidal silicic acid and 0.6 kg of polyvinyl pyrrolidone were granulated conventionally after intensive mixing, using an aqueous solution of 1.0 kg of soluble starch. The granulate was pressed without any addition of lubricant into 100,000 425 mgm-tablets in a conventional rotary machine whose pressing tools were sprayed with a 5% magnesium stearate suspension in paraffin oil by means of an intermittently operating spraying device. The suspension was supplied under a pressure of 40 bars to a one-substance nozzle, and the valve was opened mechanically at the exact moment and closed within approximately 1 microsecond. The quantity of lubricant sprayed was approximately 0.1 mgm. In comparison with the conventional mode of operation (intermixing of 1% magnesium stearate), the maximum obtainable breaking strength was increased by 40%. The entire speed range of the machine used (Kilian NRD 33 H, 240,000tablets/h) was encompassed.

EXAMPLE 2

100 kg of dimethyl aminophenyl-dimethylpyrazolone, 100 kg of phenacetin, 30 kg of caffeine, 40 kg of corn starch and 45 kg of a dry adhesive, e.g. microcrystalline cellulose, were pressed without prior granulation in a conventional "high-speed" tablet press. A 5% alcoholic stearic acid solution was applied to the molding tools via two-substance nozzles before each pressing operation. The intermittent air flow was generated via an electromagnetically operating air valve. It was actuated by a voltage pulse of 125 V lasting for 88 microseconds and closed again after approximately 2 microseconds. The lubricant reached the nozzle by natural aspiration or assisted by pressure. The sprayed quantity of stearic acid was approximately 0.06 mgm on a biplanar molded article of 13 mm. The quantity of air required is around 2.5 $cm^3$ (4 bars overpressure) per spray pulse. In comparison with the conventional mode of operation (intermixing of 1% stearic acid) the tablets have a breaking strength higher by 30% for the same applied pressure. Decomposition in water is reduced from 3 minutes to 15 seconds; abrasive resistance is markedly improved.

EXAMPLE 3

From 25 kg of an active substance A, 80 kg of lactose, 43.5 kg of corn starch and 1.5 kg of colloidal silicic acid a mixture was prepared for 1 million capsules, each of 150 mgm. The inner surface of the filling tube of a Zanasi capsule machine was wetted before each filling operation and compression with a spray pulse of lubricant (5% magnesium stearate suspension in paraffin oil). The intermittent air flow (2.5 bars overpressure) from a mechanically operating air valve entrained out of an atomizer tube approximately 0.1 mgm of suspension per spray pulse. In the hitherto conventional method 2.5% magnesium stearate had to be admixed with the powder. Since, owing to the novel method, only tiny quantities of magnesium stearate were on the surface of the compressed powdered body placed in the capsule, it was possible decisively to improve the release of active substance as the result of the better wettability of the powder (method USP XIX, medium 0.1 N HCl).

EXAMPLE 4

To prepare effervescent tablets, 78 kg of sodium bicarbonate, 175 kg of sugar, 96 kg of tartaric acid, 50 kg ascorbic acid and 1 kg of dry essence were mixed together. The mixture was pressed into tablets weighing 4 gm each on a standard tablet press equipped with a spraying device. Two intermittently operating two-substance nozzles sprayed the matrix wall, the pressing face of the lower die and that of the upper die with a 10% solution of polyethylene glycol 6000 in 1,1,1-trichloroethane. An inductive proximity switch mounted next to the lower dies ensured that the electromagnetically operating air valve transmitted the air pulses at the correct moment. Effervescent tablets can be prepared by this method without difficulties. Neither dies with a special surface nor felt packings on the lower dies which are saturated with the lubricant solution through a matrix bore from a supply container were required.

EXAMPLE 5

Saccharose of a certain particle size spectrum (93.9%) was granulated with 4% glucose syrup. After drying and screening, 1% of aromatics were admixed. Before each pressing operation the molding tools were sprayed with glycerin monostearate, so that approximately 0.1% of lubricant was applied per molded article. Spraying was carried out by means of an intermittently working one-substance nozzle, the molten monostearate being supplied to the valve from a hot-melt unit via a heated pipe. In comparison with the conventional manufacturing method, the novel method afforded a saving of 1.9% lubricant (relative to the total mixture). Also, by minimizing the lubricant, an improvement in flavor and longer stability were achieved (the tendency toward rancidity was diminished as a result of the reduction in the lubricant).

EXAMPLE 6

79% of acetylsalicylic acid (40 mesh), 12% microcrystalline cellulose, 7% potato starch and 1% colloidal silicic acid were mixed for 20 minutes and pressed into 12 mm biplanar tablets. The tablet press was equipped with a device for the intermittent spraying of the molding tools. Via a gear rim under the matrix plate an injection pump (on the principle of Diesel injection) was controlled synchronously. The pressure pulses issuing from the piston pump in the 9:1 paraffin oil/silicon oil lubricant opened the injection nozzle (hydraulically operating valve with one-substance nozzle) exactly at the moment when the molded tool was located at the prescribed point. The nozzle had two spraying holes, so that the pressing face of the lower die was sprayed simultaneously with the matrix wall of the pressing face of the upper die. Small suction devices were fitted to the matrix plate and the upper die. The spraying operation in question required less than 2 milliseconds. The 33-die double rotary machine operated with an output of 200,000 tablets per hour.

Tablets made under standardized conditions and with 1% intermixed stearic acid, in comparison with tablets made according to this example, undergo after 6 months (humidity, temperature and packing are the same) hydrolysis into salicylic acid which is 3 times higher as a result of the incompatability between packed substance and lubricant.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A method for the compression molding of tablets, pill cores, cores for hard gelatin capsules, and the like, which comprises:

before each molding operation spraying unto each molding surface of compression molding tools for molding tablets, pill cores, cores for hard gelatin capsules, or the like a measured amount of lubricant selected from the group consisting of suspensions, solutions, and melts of lubricating agents selected from the group consisting of fatty acids and their salts, metal soaps, fatty acid esters, higher aliphatic alcohols, polyethylene glycols, paraffin, and silicon oil by means of intermittently and briefly spraying nozzle system, the amount of lubricant deposited comprising from about 0.5 to 5% of the material to be compression molded;

introducing into the compression molding tools lubricant-free material to be compression molded; and compression molding the lubricant-free material.

2. Method according to claim 1, wherein the lubricant comprises a lubricating agent dissolved in an organic solution.

3. Method according to claim 1, wherein the lubricant comprises the melt of a lubricating agent.

4. Method according to claim 1, wherein the lubricant is an alcoholic stearic acid solution.

5. Method according to claim 1, wherein the lubricant is a magnesium stearate suspension.

6. Method according to claim 1, wherein the lubricant liquid or suspension is applied by directed spraying by means of a jet system to the surfaces of the compression tools participating in the compressing operation.

7. Method according to claim 1, wherein the lubricant is applied by a directed spraying to the surfaces of the compression tools participating in the compression operation and the spray jet is generated by means of one-substance nozzles.

8. Method according to claim 1, wherein the lubricant is applied by directed spraying to the surfaces of the compression tool participating in the compression operation with the aid of two-substance nozzles which atomize the lubricant with the aid of compressed air, steam or gas as propellant.

9. Method according to claim 1, wherein the lubricant is applied by directed spraying to the surfaces of the compression tools participating in the compression operation by means of an ultrasonic vibrator.

10. Method according to claim 1, wherein a continuous spray jet is divided into individual intermittent spray pulses by a perforated disc driven by a synchronous motor.

11. Method according to claim 1, wherein intermittent spraying is achieved by means of valves which are connected in front of the nozzles, which operate mechanically or electromagnetically or pneumatically or hydraulically and which regulate either the metered or unmetered feed of the lubricant, or the metered or unmetered supply of the vehicle ensuring spraying, and the signals for actuating the valve are tapped from moving parts of the compression machine mechanically or photoelectrically or by means of inductive or capacitive proximity switches or with the aid of hydraulics.

12. Method according to claim 1, wherein a mechanically or electromagnetically operated valve meters and interrupts the air flow and the lubricant is supplied continuously.

13. Method according to claim 1, wherein the lubricant is conveyed to the nozzle by means of a pump, optionally in conjunction with a pressure vessel, and a flow monitor in the lubricant and/or air flow switches off the machine when lubrication is discontinued.

14. Method according to claim 1, wherein multiple compression tools are sprayed by a corresponding number of nozzles.

* * * * *

UNITED STATES PATENT AND TRADEMARK OFFICE

CERTIFICATE OF CORRECTION

PATENT NO. : 4,323,530

DATED : April 6, 1982

INVENTOR(S) : GÜNTHER VOSS and PETER GRUBER

It is certified that error appears in the above—identified patent and that said Letters Patent is hereby corrected as shown below:

Title page [75]: "Brietbrunn" should read -- Breitbrunn --.

Column 3, line 47: "dis-" should read -- di- --.

Column 3, line 48: "tearate" should read -- stearate --.

Column 6, line 35: "of" should read -- or --.

Signed and Sealed this

*Sixth* Day of *July 1982*

[SEAL]

*Attest:*

GERALD J. MOSSINGHOFF

*Attesting Officer* *Commissioner of Patents and Trademarks*